United States Patent
Liu et al.

(10) Patent No.: US 8,516,800 B2
(45) Date of Patent: Aug. 27, 2013

(54) SYSTEM AND METHOD FOR INTRODUCING A REDUCTANT AGENT

(75) Inventors: Baoyong Liu, Dunlap, IL (US); Sylvain J. Charbonnel, Peoria, IL (US); Jinhui Sun, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 433 days.

(21) Appl. No.: 12/976,762

(22) Filed: Dec. 22, 2010

(65) Prior Publication Data
US 2012/0159928 A1 Jun. 28, 2012

(51) Int. Cl.
*F01N 3/20* (2006.01)

(52) U.S. Cl.
USPC .......... 60/286; 60/274; 60/277; 60/287; 60/295; 60/298; 60/301

(58) Field of Classification Search
USPC .......... 60/274, 277, 282, 286, 287, 295, 60/298, 301
See application file for complete search history.

(56) References Cited

U.S. PATENT DOCUMENTS

| | | | |
|---|---|---|---|
| 3,875,743 A | 4/1975 | Mercer | |
| 3,979,906 A | 9/1976 | Staggs | |
| 6,532,736 B2 | 3/2003 | Hammerle et al. | |
| 6,679,200 B2 | 1/2004 | Dingle | |
| 6,742,326 B2 | 6/2004 | Xu et al. | |
| 6,941,746 B2 | 9/2005 | Tarabulski et al. | |
| 7,028,465 B2 | 4/2006 | Ripper et al. | |
| 7,065,958 B2 | 6/2006 | Funk et al. | |
| 7,178,328 B2 | 2/2007 | Solbrig | |
| 7,426,825 B2 | 9/2008 | Viola et al. | |
| 7,587,890 B2 | 9/2009 | Stroia et al. | |
| 2004/0098979 A1* | 5/2004 | Hammerle et al. | 60/295 |
| 2004/0206069 A1 | 10/2004 | Tumati et al. | |
| 2007/0289290 A1 | 12/2007 | Bartley et al. | |
| 2008/0016853 A1 | 1/2008 | Zhang et al. | |
| 2009/0288394 A1 | 11/2009 | Kesse et al. | |
| 2009/0301067 A1 | 12/2009 | Dingle et al. | |
| 2010/0223914 A1* | 9/2010 | Doring et al. | 60/286 |
| 2010/0242439 A1* | 9/2010 | Domon et al. | 60/274 |

FOREIGN PATENT DOCUMENTS
JP 10-212931 A 8/1998

* cited by examiner

*Primary Examiner* — Thomas Denion
*Assistant Examiner* — Jorge Leon, Jr.
(74) *Attorney, Agent, or Firm* — Leydig, Voit & Mayer

(57) ABSTRACT

A system and method controls injection of a reductant agent in a selective catalytic reduction system. The system and method include an injector injecting the reductant agent to an exhaust system directing exhaust from a power system. A coolant system circulates coolant proximate to the injector. A coolant temperature sensor monitors a coolant temperature of the coolant. A controller adjusts the injection timing of the injector based at least in part on the coolant temperature.

18 Claims, 4 Drawing Sheets

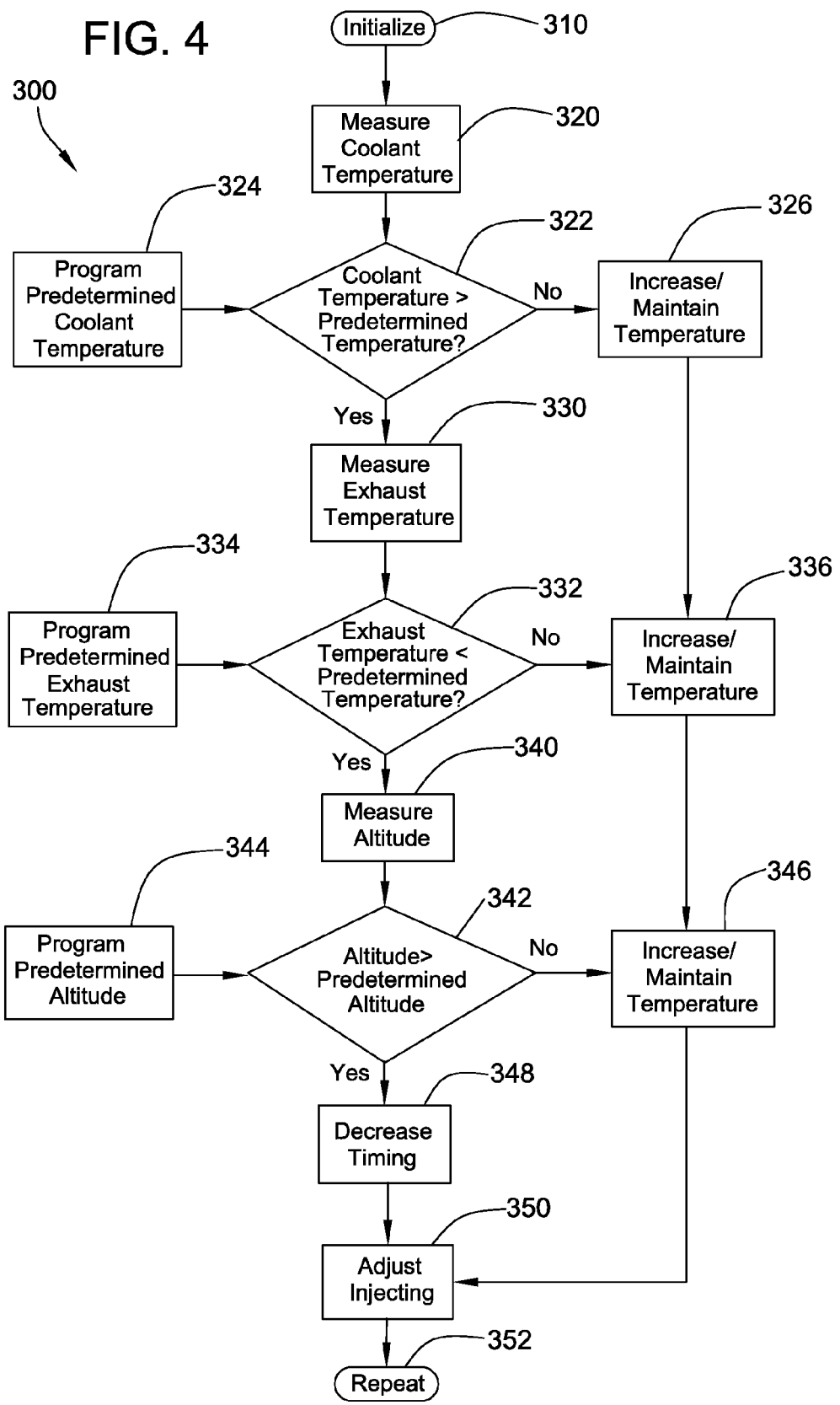

SYSTEM AND METHOD FOR INTRODUCING A REDUCTANT AGENT

TECHNICAL FIELD

This patent disclosure relates generally to an exhaust treatment system and, more particularly, to a system and method for introducing a reductant agent to the exhaust. The system and method of this disclosure may be utilized with internal combustion engines and similar power generating systems.

BACKGROUND

Internal combustion engines, including diesel engines, gasoline engines, and natural gas burning engines, create and emit a variety of different pollutants during operation that may be harmful to the environment and to human and animal health. These air pollutants can include, for example, oxides of nitrogen such as $NO_2$ and $NO_3$, commonly referred to as $NO_x$. Due to increased environmental awareness, including government mandated emissions regulations and control, many manufacturers of internal combustion engines have taken measures to reduce the amount or effect of the pollutants that are created. Some of these measures are incorporated into the exhaust system associated with the internal combustion engine to remove, trap or chemically react with the pollutants being exhausted from the engine.

One type of exhaust treatment measure that reduces $NO_x$ through a chemical reaction is known as Selective Catalytic Reduction, commonly referred to as SCR. In the SCR process, a gaseous or liquid reductant agent is introduced to the exhaust system where the reductant agent can intermix with the exhaust gasses or it can be adsorbed onto a catalyst located in the exhaust system downstream of the internal combustion engine. A common reductant agent is urea, though other suitable substances such as ammonia may be readily used in an SCR process. The $NO_x$ pollutants can react with the reductant agent and the catalyst such that the $NO_x$ is converted into environmentally benign nitrogen (N2) and water (H2O).

Conversion of the reductant agent and the $NO_x$ is dependent upon a number of factors including the quantity of $NO_x$ produced, the exhaust temperature and the duration of the reaction before the exhaust gasses exit the SCR system. These factors also frequently change with the operating conditions of the internal combustion engine, resulting in either too little reductant agent being supplied and unacceptably low $NO_x$ conversion or too much reductant agent being supplied with the consequence of unconverted agent being expelled to the atmosphere, a phenomenon known as slippage. Another negative effect of introducing too much reductant agent is the formation of deposits of the agent within the exhaust system. Various systems and methods now exist to control the amount and/or rate of reductant agent injection in order to account for these variables and factors and maximize conversion efficiency.

One such system is described in U.S. Pat. No. 7,178,328 (the '328 patent), titled System for Controlling the Urea Supply to SCR Catalyst, which describes an electronic control module for controlling the SCR system. The control module measures a plurality of factors including exhaust temperature, intake airflow, and $NO_x$ quantities. From these factors, the control module calculates an injection strategy that may involve intermittent dosing of reductant agent to the exhaust system. In the '328 patent, intermittent dosing involves injecting excess reductant agent to the SCR catalyst followed by a period of delay during which the reductant agent converts with the $NO_x$ to maximize conversion efficiency.

The present disclosure is directed at overcoming one or more of the deficiencies described above and/or other problems present in the art.

SUMMARY

The disclosure describes, in one aspect, a selective catalytic reduction system for use with a power system such as an internal combustion engine. The selective catalytic reduction system cooperates with an exhaust system communicating with the power system to direct exhaust from the power system. A catalyst is disposed in the exhaust system for reducing nitrous oxides in the exhaust. The system provides an injector communicating with the exhaust system upstream of the catalyst to inject a reductant agent to the exhaust. A coolant system is included to circulate coolant to the power system. The coolant system also circulates coolant proximately about the injector to affect a temperature of the injector. A coolant temperature sensor monitors the coolant temperature. A controller communicating with the coolant temperature sensor can control or adjust the injection timing of the injector based at least in part on the coolant temperature.

In another aspect, the disclosure describes a method of controlling the injection of a reductant agent to an exhaust system in a selective catalytic reduction system. The method involves directing exhaust from a power system via an exhaust system and injecting a reductant agent into the exhaust via an injector communicating with the exhaust system. The method also circulates coolant from a coolant system to the injector and monitors a coolant temperature of the coolant. The method may then adjust the injection timing of injecting the reductant agent based in part on the coolant temperature.

In yet another aspect, the disclosure describes a method of reducing deposit build-up in an exhaust system communicating exhaust from a power system. The method involves circulating a coolant to the power system and dosing the exhaust with an agent to convert the agent to a reductant. The method then monitors a coolant temperature of the coolant. If the method determines the coolant temperature is above a predetermined coolant temperature value, the method may adjust the timing pattern of dosing in order to increase a quantity of agent converted to reductant.

BRIEF DESCRIPTION OF THE DRAWING(S)

FIG. 4 is a schematic flow chart illustrating another embodiment of a method for controlling the injector based at least in part upon the exhaust temperature of the exhaust in addition to the coolant temperature.

DETAILED DESCRIPTION

Figure 1:
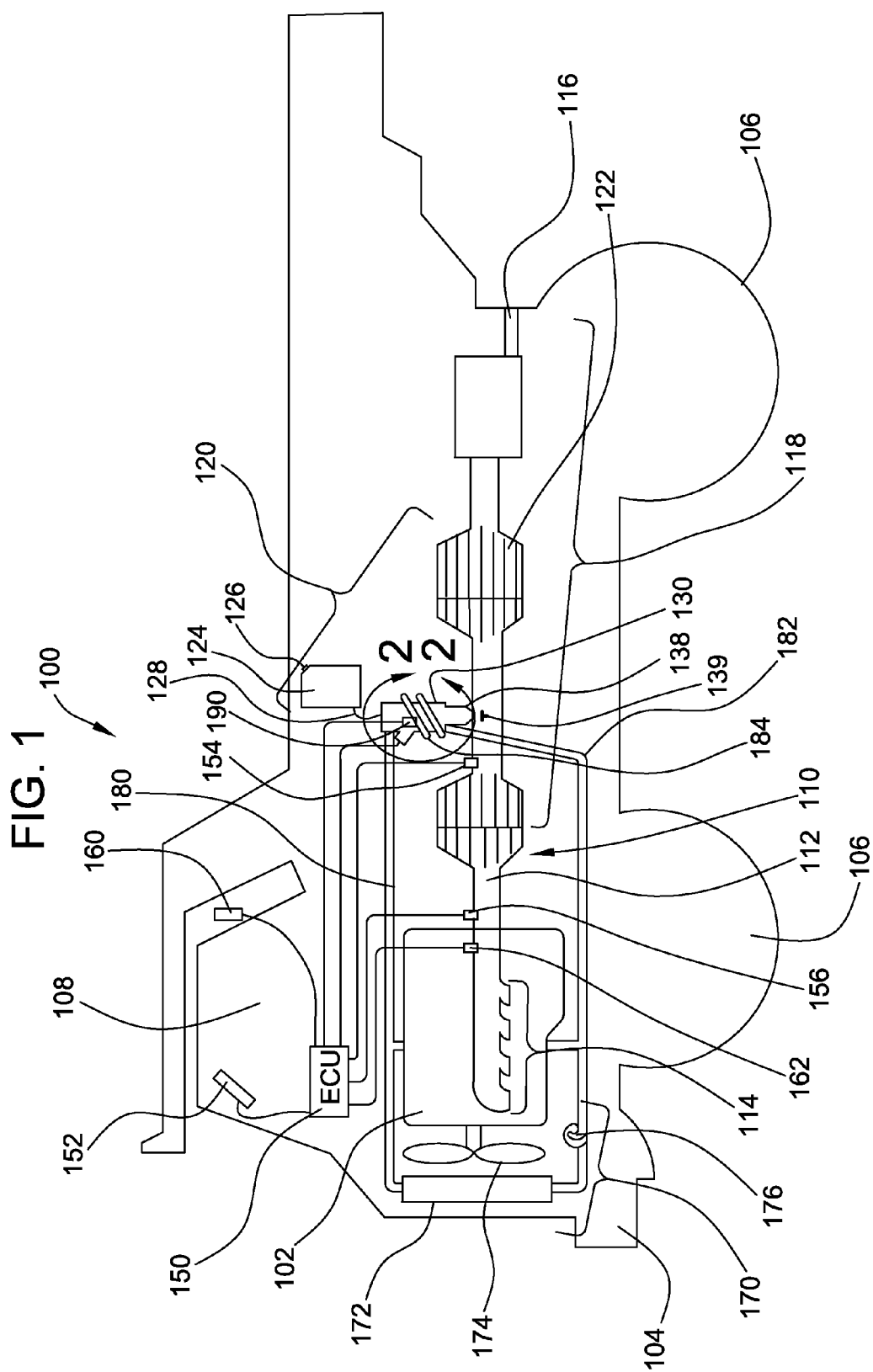
FIG. 1 is a diagrammatical illustration of a machine including a power system in the form of an internal combustion engine and an exhaust treatment system for reducing pollutants in the exhaust from the engine.

This disclosure relates generally to a system and method for controlling the introduction of a reductant agent to exhaust from a power system as part of an overall exhaust treatment process. Referring to FIG. 1, there is illustrated a power system 102 in the form of an internal combustion engine that is incorporated into a vehicular machine 100 such as a dump truck. Although the illustrated power system 102 is an internal combustion engine and, in particular, a diesel engine, the present disclosure can relate to any suitable type of power system that combusts fossil fuels and similar substances including, for example, gasoline engines, natural gas engines, propane-based engines, and coal-burning power systems. Likewise, although the illustrated machine 100 is a dump truck, it will be appreciated that the power system 102 can be implemented on any type of vehicular machine that utilizes such systems for powering motion or the operation of working implements. The power system 102 can also be utilized in any of various stationary applications such as electric generators and pumps.

The power system 102 is associated with an exhaust system 110 that carries away exhaust products that are produced by the combustion process. The power system 102 and exhaust system 110 are supported by a frame 104 of the machine 100. In the illustrated embodiment of a vehicular machine 100, the frame 104 in turn is supported upon one or more wheels 106 rotatably driven by the power system to enable the machine to travel over a road or similar surface. To accommodate an operator who controls the machine 100, the frame 104 can also support or delineate an operator's cab 108 from where the steering mechanism and various machine controls can be accessed. Of course, in stationary applications, the operator's cab 108 may be unnecessary and therefore not included.

In the illustrated embodiment, the exhaust system 110 includes an exhaust pipe or exhaust channel 112 that is disposed through the machine 100 to convey the exhaust products from the power system 102 to the surrounding environment. While the illustrated exhaust channel 112 is in the form of an elongated conduit extending the length of the machine, it will be appreciated that the exhaust channel can have any suitable shape, size or arrangement depending upon the application in which the power system 102 is used. The exhaust channel 112 mounts to the power system 102 via an exhaust manifold 114 and terminates at an exhaust orifice 116 where the exhaust products are discharged to the atmosphere. In various embodiments, a turbo-charger may be operationally disposed between the exhaust manifold 114 and the exhaust channel 112.

To reduce the harm or impact that the exhaust products may have on the environment and/or the health of humans and animals, the exhaust system 110 may include one or more after-treatment devices 118 or systems that remove or convert harmful pollutants before they enter the atmosphere. Such devices and systems are often referred to as after-treatment devices because they function or operate after the exhaust products have been created in and discharged from the power system 102 and are thereby distinguished from fuel formulations and similar pre-combustion measures. The after-treatment devices 118 can include diesel particular filters (DPFs), catalytic convertors, diesel oxidation catalysts (DOCs), and/or mufflers that are disposed along the exhaust channel 112 such that the exhaust gasses are directed through the after-treatment devices causing removal or treatment of the pollutants.

As stated above, a particular type of an after-treatment device or system that may be included with the exhaust system 110 is an SCR system 120. SCR systems operate by intermixing a reductant agent with the exhaust gasses in the presence of a catalyst 122 to convert harmful $NO_x$ to environmentally more friendly nitrogen ($N_2$) and water ($H_2O$). To store the reductant agent, which typically is a fluid, the SCR system 120 may include a storage vessel or storage tank 124 mounted or supported on the frame 104 of the machine 100. To replenish the supply of reductant agent, the storage tank 124 may include an inlet 126 that is accessible from the exterior of the machine 100. To convey or direct the reductant agent from the storage tank 124 to the exhaust system 110, a fluid line 128 can be arranged in fluid communication with the storage tank and the exhaust channel 112. The fluid line 128 can be any suitable type of line for conveying or directing a fluid such as a flexible hose or a metal or plastic conduit.

Figure 2:
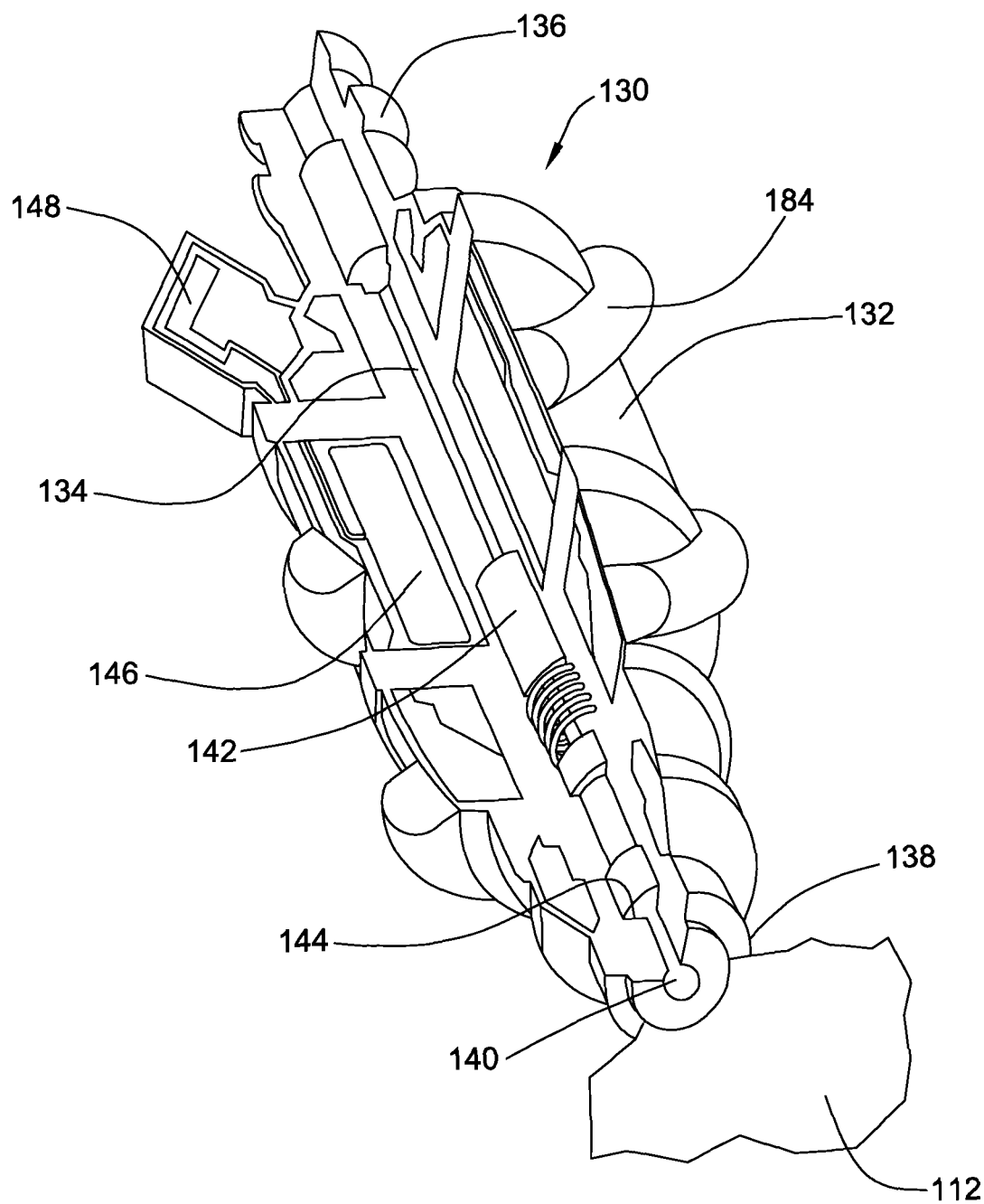
FIG. 2 is a detailed view of an injector indicated by circle 2-2 in FIG. 1 for introducing reductant agent to the exhaust system and cooled by coolant from the internal combustion engine, the injector illustrated in partial cutaway to depict the internal components.

To introduce the reductant agent to the exhaust channel 112, the fluid line 128 attaches to and terminates at an injector 130. Referring to FIG. 2, the injector 130 in a possible embodiment may include a generally cylindrical injector body 132 that defines an internal bore 134 extending through the length of the injector body. At one end of the injector body 132 there is formed a fluid connector 136 that may connect with the fluid line for directing reductant agent into the internal bore 134. The opposite end of the injector body 132 terminates at an injector tip 138 that can define or form an orifice or nozzle 140 through which reductant agent channeled via in the internal bore 134 can exit from the injector 130.

To facilitate controlled dispersion of the reductant agent from the injector 130, the nozzle 140 may be selectively opened or closed by a reciprocating plunger 142 accommodated within the internal bore 134. When the plunger 142 is reciprocated fully forward in the internal bore 134, it may urge against an appropriately formed valve seat 144 inside the injector tip 138 to seal closed the nozzle 140. A solenoid or a similar electro-magnetic device 146 may actuate the back and forth movement of the reciprocating plunger 142 in the internal bore 134. To supply power to the injector 130, an electrical connection 148 may be disposed on the injector body 132 and communicate with an electrical source.

Referring to FIGS. 1 and 2, the injector 130 accesses the exhaust channel 112 with the injector tip 138 and orifice 140 set flush with the wall of the exhaust channel 112. In the embodiment illustrated in FIG. 1, the injector 130 accesses the exhaust channel 112 at a point upstream of the catalyst 122 so that the reductant agent may intermix with the exhaust gasses before they enter or come into contact with the catalyst. In an alternative embodiment, the injector can be located at a bend or elbow in the exhaust channel so that the reductant agent is introduced or injected inline with the flow of the exhaust gasses approaching the catalyst. In further embodiments, the injector tip might protrude into the exhaust channel so as to be disposed into the flow path of the exhaust toward the catalyst or it may be located in a recess or cavity formed in the wall of the exhaust channel.

To dissipate or disperse the injected reductant agent with the exhaust gasses, a flange 139 or similar structure may be provided in the exhaust channel 112 towards which the injector tip 138 and incoming reductant agent are directed. In various embodiments, the flange 139 may be formed separate from or as part of the injector 130. In other embodiments, the injector 130 can access the catalyst 122 itself so that the reductant agent is introduced directly therein. The catalyst 122 may be a self-contained unit with an internal structure such as a ceramic honeycomb frame or metal mesh substrate or possibly a zeolite-based mineral or ceramic that is coated or treated with a material that initiates or undergoes a chemical reaction to alter the composition of the exhaust gasses. The process of introducing the reductant agent to the exhaust stream or the catalyst is sometimes referred to as "dosing."

To control dosing of the reductant agent from the injector, the SCR system 120 may include or be associated with an electronic control unit, module or controller 150 located onboard the machine 100. The controller 150 can include a microprocessor or other appropriate circuitry and can have memory or data storage capabilities. Although in FIG. 1 the illustrated controller 150 is represented as a single, discrete unit, in other embodiments the controller and its functions may be distributed among a plurality of distinct and separate units. In addition to controlling the SCR system 120, the controller 150 may be tasked with controlling various other systems and processes associated with the machine. Moreover, the controller 150 can include a user interface 152 accessible from the operator's cab 108 that can communicate information to and receive instructions from an operator.

To receive information about the SCR system 120, the controller 150 can be communicatively linked with various sensors and instruments disposed about the machine 100. For example, the controller 150 can be communicatively linked directly to the electrical connector on the injector 130 to control and provide operative power to the injector. The controller 150 can also be communicatively linked to an exhaust temperature sensor 154 disposed into the exhaust channel 112 to measure the temperature of the exhaust. The controller 150 may be further communicatively linked to an NQ sensor 156 disposed into the exhaust channel 112 to measure the quantities of NQ in the exhaust gasses. Other sensors the controller can communicate with include an altitude sensor 160 for determining the altitude of the machine 100 and a mass-flow sensor 162 for determining mass-flow and/or volume-flow of the exhaust gasses from the power system 102.

The controller 150 can adjust the amount of reductant agent injected to the exhaust system and the timing, rate and/or frequency of injection based upon information received from these sensors. For example, as explained above, the rate of conversion of reductant agent with $NO_x$ is dependent upon several factors and variables that frequently change with the operating conditions of the power system. Hence, the amount of reductant agent that is introduced to the exhaust system during a given time period may need to be adjusted to account for these changing factors and to maintain efficient conversion of $NO_x$.

Furthermore, in SCR systems utilizing injectors that can be selectively opened and closed, such as the presently described embodiment, one common injection control strategy involves periodic or intermittent injecting or dosing reductant agent to the exhaust system. By way of example, the controller 150 under typical conditions may be programmed to operate the injector 130 with a timing or a frequency of 1 hertz, or one injection per second. At this frequency, the injector may be opened for 0.1 seconds so that pressurized reductant agent is introduced to the exhaust system and closed for the remaining 0.9 seconds of the injection cycle. The closed period or delay between injections allows the recently introduced reductant agent to convert with the $NO_x$ before more reductant agent is introduced thereby allowing for efficient conversion without slippage or deposit buildup. As the operating conditions of the power system and other factors change, the controller 150 can adjust the injection timing, frequency or period as necessary to maintain efficient conversion.

Accurate control of the injector is in part influenced by its temperature. For example, because the injector tip 138 is set flush in the wall of the exhaust channel 112 and is exposed to the hot exhaust gasses, the injector may quickly overheat especially if the injector body is metallic or made of another thermal conductive material. Additionally, the exhaust system 110 may undergo a regeneration cycle or similar thermal event in which significant heat is utilized to burn off particulate deposits located in the diesel particulate filter (DPF) or elsewhere in the exhaust channel 112. Such thermal events may also overheat the injector 130. Conversely, if the machine 102 is to be used or stored in sub-freezing temperatures for a prolonged time, the temperature of the injector 130 may cool to a point at which the injector no longer functions properly. To maintain the injector 130 at a temperature or a range of temperatures that facilitate its operation, a coolant from a coolant system 170 associated with the power system 102 may be circulated through, around or proximate to the injector.

Such coolant systems 170 are commonly employed with internal combustion engines to remove or dissipate heat generated by the internal combustion process. Referring to FIG. 1, the coolant system 170 can include a radiator 172 coupled to the power system 102 by hoses. The radiator 172 itself may be made of hollow tubes and fins through which a coolant can flow. To draw air over the radiator 172 and remove heat from the coolant flowing therein, a fan 174 may be coupled to the front of the power system 102 and directed toward the radiator. To forcibly circulate coolant through the radiator 172 and the power system 102, the coolant system 170 may further include a pump 176.

To circulate coolant to and from the coolant system 170 to the injector 130, a forward line 180 connected to the coolant system is directed to the injector and a corresponding return line 182 is direct from the injector back to the coolant system. The forward line 180 and the return line 182 may be flexible hoses as are commonly used with radiator-operated coolant systems. The forward line 180 and/or return line 182 may also be directed to the storage tank 124 to assist in maintaining the temperature of the reductant agent therein. In the embodiment illustrated in FIGS. 1 and 2, a portion of the flexible hose may also be disposed or wrapped around the injector. This injector hose 184 is proximate to or in contact with the injector body 132 so that thermal transfer between the coolant and the injector body may occur. In other embodiments, rather than disposing the injector hose 184 about the injector 130, channels may be formed directly into the injector body 132 through which the coolant may be directed in a manner similar to a fluid jacket. The coolant flowing in the coolant system can thereby transfer heat from and/or to the injector and maintain its temperature.

Despite efforts to maintain the temperature of the injector 130 at a point or range that facilitates its proper operation and functioning, the temperature of the injector may reach a point where the injector will begin malfunctioning. For example, the temperature of the injector 130 may rise to a point where the reductant agent inside the injector begins to boil. The boiling of the reductant agent may occur at the injector tip 138 which is exposed to the hot exhaust gasses. Urea, a common reductant agent, typically boils at 103° C. at sea level. Referring to FIG. 2, if the reductant agent boils and transitions from a liquid phase to a gaseous phase inside the injector 130, the gaseous reductant agent may be able to seep past the plunger 142 when it is otherwise in a closed position and unintentionally leak from the injector into the exhaust system. Additionally, overheating of the injector 130 may result in thermal expansion that disrupts proper sealing between the plunger 142 and the valve seat 144 resulting in further leakage. Another possible consideration is that the temperature of the injector 130 might preheat the reductant agent so that it more readily converts with the $NO_x$, allowing for a different amount or injection pattern of reductant agent to be used.

Referring to FIG. 1, it can be appreciated that the leakage of reductant agent from the injector 130 results in a larger or excess quantity of reductant agent being introduced to the exhaust system 110 than may be otherwise intended for the prevailing operating conditions. The excess reductant agent may accumulate in the exhaust channel 112 where it will have insufficient time to convert with $NO_x$ or otherwise dissipate with the exhaust gasses before the controller 150 causes the injector 130 to introduce additional reductant agent. This results in inefficient conversion of reductant agent, possibly in combination with slippage of the unconverted reductant agent to the atmosphere. One further detrimental effect of the presence of the excess reductant agent in the exhaust channel is that the reductant agent may possibly form deposits along the walls of the exhaust channel. These deposits may block or otherwise interfere with the introduction of the reductant agent and may adsorb and remove reductant agent before it can convert with the $NO_x$.

To address the issues regarding temperature of the injector 130 and the associated leakage of reductant fluid, there is provided a coolant temperature sensor 190 monitoring the coolant temperature of the coolant from the coolant system 170. The coolant temperature sensor 190 can be located proximate to the injector 130 to provide an accurate reading of the temperature of the coolant at the injector. Although in the illustrated embodiment the coolant temperature sensor 190 is in direct thermal contact with the coolant, it will be appreciated that in other embodiments, the coolant temperature sensor can be located elsewhere and can monitor the temperature at that location to provide an indirect measurement of the coolant temperature. For example the coolant temperature sensor 190 can be in thermal contact with the injector body 132 to obtain an indirect measurement of the coolant temperature inside the injector 130.

The coolant temperature sensor 190 communicates with the controller 150 to provide the controller with the coolant temperature or the estimated coolant temperature. The controller 150 can therefore utilize the coolant temperature, which is indicative of the temperature of the injector 130, when it adjusts the timing, rate, frequency or amount of reductant agent introduced to the exhaust system via the injector. In those embodiments in which the coolant temperature sensor 190 is not in direct thermal contact with the coolant, the controller 150 and/or the coolant temperature sensor 190 can utilize predictive logic or electronic tables and maps to estimate the actual temperature of the coolant/injector. For example, in an embodiment, the coolant temperature sensor 190 can measure the temperature of the exhaust gasses inside the exhaust channel 112. Utilizing the exhaust temperature and possibly the duration the exhaust gasses are at that temperature, the flow rate of the exhaust gasses, and/or other factors, the controller 150 can indirectly estimate the temperature of the coolant. In such an embodiment, the coolant temperature sensor 190 can be combined with the exhaust temperature sensor 154.

Figure 3:
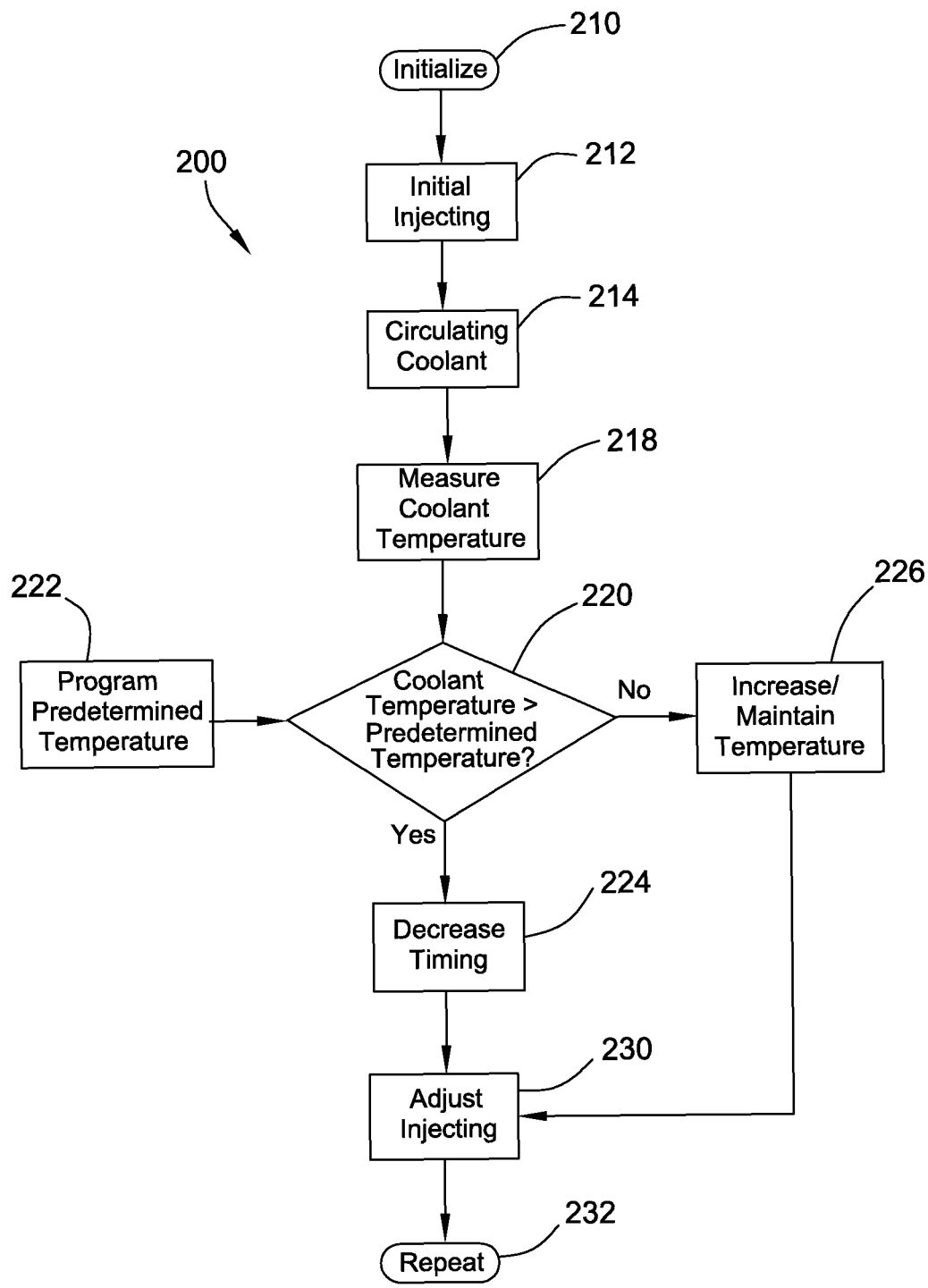
FIG. 3 is a schematic flow chart illustrating an embodiment of a method for controlling the injector based at least in part upon a coolant temperature of the coolant.

The controller 150 can also include software or logic that embodies a control strategy to receive and process information from the coolant temperature sensor 190 and to operate the injector 130. Referring to FIG. 3 in conjunction with FIG. 1, there is illustrated a visual representation of one possible embodiment of a basic control strategy 200 or routine in the form of a flow chart that can be performed by the controller 150. The illustrated control strategy 200 may begin with an initializing step 210 that is triggered by, for example, starting the power system 102 of the machine 100. As can be appreciated, this may provide electrical power for use by the controller 150 and the various sensors 154, 156, 160, and 162 onboard the machine 100. In an initial injecting step 212, the controller 150 may command the injector 130 to begin injecting reductant agent to the exhaust system at a first pre-set timing and/or amount that corresponds to proper operation of the injector under normal temperature conditions. To maintain an operational temperature of the injector 130, the control strategy 200 in a coolant circulation step 214 may direct the coolant system 170 to circulate coolant to the injector. The temperature of the coolant can be measured by a coolant temperature measurement step 218 by utilizing the coolant temperature sensor 190 which, as described above, can provide an indirect assessment of the temperature of the injector 130. Alternatively, in the embodiments where the coolant temperature sensor is in direct thermal contact with the injector body, it will be appreciated that the sensor will provide a direct reading of the injector temperature which provides an indirect measurement of the coolant temperature.

To determine if the temperature of the injector 130 has increased to a point where the injector is no longer functioning properly, the control strategy 200 may also include logic to perform a coolant temperature comparison step 220. The coolant temperature comparison step 220 compares the coolant temperature received from the coolant temperature sensor 190 with a predetermined coolant temperature value that may be preprogrammed or input to the controller 150 via a previously performed predetermined coolant temperature programming step 222. The predetermined coolant temperature value may correspond to the boiling temperature of the reductant agent, such as 103° C. at sea level. Hence, the coolant temperature comparison step 220 can determine indirectly if the temperature of injector 130 is likely at a point where the reductant agent may start boiling and leaking unintentionally to the exhaust system.

In the event the coolant temperature comparison step 220 confirms that the temperature of the injector 130 is above the predetermined coolant temperature value, the controller 150 can adjust the timing pattern and/or amount of reductant agent introduced to the exhaust system 110 to compensate for the unintentional leakage. For example, the controller 150 in a decrease timing step 224 can generate a command to decrease or slow the timing pattern, i.e., decrease the frequency or lengthen the period between injections of reductant agent into the exhaust system 110. The controller 150 then communicates the command generated by the decrease timing step 224 onto the injector 130. As a more particular example, in the embodiment discussed above in which the normal injection timing is 1 hertz or one injection per second, the command generated by the controller 150 in the decrease timing step 224 can decrease or slowdown the timing period between injections to 0.5 hertz, or one injection per every two seconds. This provides additional time for both the injected reductant agent and the leaked reductant agent in the exhaust system 110 to convert or otherwise dissipate. In an alternative embodiment, the controller 150 can reduce the quantity or amount of reductant agent introduced to the exhaust system 110.

If, however, the coolant temperature comparison step 220 determines that the temperature of the injector 130 is below the predetermined coolant temperature value, the controller 150 can generate a command in an increase/maintain timing step 226 that can increase or maintain the timing, i.e., increase the frequency or shorten the time period between injections. Increasing or maintaining the timing is possible because the coolant is maintaining the temperature of the injector 130 at a range or point that avoids causing leakage and thus the presence of excess reductant agent in the exhaust system 110.

If the control strategy executes either a decrease timing step 224 or a increase/maintain timing step 226, the commands generated by the controller 150 adjust the injection pattern of the injector 130 in an adjustment step 230 to continue introducing reductant agent at the appropriate timing and/or amount for the prevailing operating conditions so as to increase the conversion efficiency. It will be appreciated that the control strategy 200 can in a repeat step 232 repeat the above steps as a continuous or periodic loop to continue timely adjustment of the SCR process as the operating conditions change.

Although the embodiment of the control strategy 200 described with respect to FIG. 3 indicates that adjustments to reductant agent injection timing should occur at set points, e.g., once the predetermined coolant temperature is exceeded, it will be appreciated that in other embodiments the adjustment can be more or less continuous. For example, the controller 150 can be programmed to decrease the injection timing inversely with the measured coolant temperature from the coolant temperature sensor 190. Hence, as the coolant temperature rises thereby indicating that reductant agent is more likely to be leaking from the injector, the injection timing can be decreased allowing a longer period between injections for the reductant agent in the exhaust system to react or convert with the NO$_x$.

While the embodiment of the control strategy in FIG. 3 is illustrated as utilizing only the coolant temperature to adjust injection timing, it will be appreciated that in other embodiments various other variables and conditions can also be utilized. For example, referring to FIG. 4 in conjunction with FIG. 1, there is illustrated another embodiment of a control strategy 300 represented as a flow chart to be performed by the controller that can utilize exhaust temperature and altitude in addition to coolant temperature. The illustrated control strategy 300 starts with an initializing step 310 that may also activate injecting of the reductant agent and circulating of the coolant.

To assess the temperature of the injector 130, in a coolant temperature measurement step 320 the coolant temperature sensor 190 can measure the coolant temperature, directly by thermal contact with the coolant or indirectly by thermal contact with the injector 130, and communicate that information to the controller 150. The controller 150 in a coolant temperature comparison step 322 can compare the coolant temperature with a predetermined coolant temperature value that may have been preset or programmed to the controller in a predetermined coolant temperature programming step 324. If the actual coolant temperature is below the predetermined coolant temperature value, indicating that leakage of reductant agent is unlikely, the controller 150 can execute an increase/maintain timing step 326 that generates a command to increase or maintain the injection timing which is communicated onto the injector 130.

If, however, the coolant temperature comparison step 322 determines the coolant temperature is above the predetermined coolant temperature value, the control strategy 300 can assess other factors to determine whether it is desirable to adjust the injection timing. For example, the exhaust temperature sensor 154 in an exhaust temperature measurement step 330 can monitor the temperature of the exhaust gasses in the exhaust system 110 and can communicate that information onto the controller 150. The controller 150 can also include information regarding a predetermined exhaust temperature from a predetermined exhaust temperature programming step 334. The controller 150 can then perform an exhaust temperature comparison step 332 in which the actual exhaust temperature is compared to the predetermined exhaust temperature. Because the rate of conversion of reductant agent and NO$_x$ is related to temperature, the actual exhaust temperature might be sufficiently high to convert the excess reductant agent leaked into the exhaust system 110. Hence, if the actual exhaust temperature is above the predetermined exhaust temperature, the controller can execute another increase/maintain timing step 336 signifying that despite possible leakage of reductant agent from the injector 130, the temperatures are sufficient to maintain efficient conversion.

If, however, the actual exhaust temperature is below that of the predetermined exhaust temperature, signifying that the conversion rate of reductant agent is relatively slow, the controller can measure other parameters to determine whether to adjust injection timing. For example, the altitude sensor 160 in an altitude measuring step 340 can measure the altitude at which the machine 100 is operating. That information can be communicated to the controller 150 along with a predetermined altitude value programmed during a predetermined altitude programming step 344. The controller 150 can execute an altitude comparison step 342 that compares the actual altitude with the predetermined altitude. It should be appreciated that the temperature at which the reductant agent boils is inversely dependent upon altitude so that the reductant agent will boil at a lower temperature when present at a higher altitude. Hence, at lower altitudes the reductant agent is less likely to boil inside the injector causing leakage to the exhaust system. If the altitude comparison step 342 therefore determines that the actual altitude is below the predetermined altitude, the controller 150 can execute an increase/maintain timing step 346 that generates a command to the injector to increase or maintain the injection timing.

If, however, the actual altitude is above the predetermined altitude, the reductant agent will more readily boil inside the injector at a lower temperature thus causing leakage. The controller 150 in this case can execute a decrease timing step 348 commanding the injector 130 to decrease the timing of injection. If either an increase/maintain timing command or a decrease timing command are received by the injector, the injector will adjust the timing in an adjustment step 350. To provide for continual adjustment of injection timing, the control strategy 300 can include a repeat step 352 that repeats the various measurement and comparison steps. Although measurement and comparison of the various factors and variables are described in a particular sequence and order with respect to FIG. 4, it will be appreciated that any other suitable order or sequence comparing these and other factors will achieve the purpose of the disclosure. It should also recognized that adjustment of the injection timing and/or amount can occur incrementally at set points or continuously.

INDUSTRIAL APPLICABILITY

The disclosed SCR system and control strategies are useful to increase the efficiency of conversion between the reductant agent and the NOx. Referring back to the machine 100 depicted in FIG. 1, the injector 130 is at least partially disposed in the exhaust channel 112 to introduce reductant agent to the exhaust gasses directed away from the power system 102. The controller 150 can communicate with various sensors such as an NOx sensor 156 and an exhaust temperature sensor 154 and, using the information received, can control the timing of injection from the injector to the exhaust system. To maintain the temperature of the injector 130, which because of its exposure to the hot exhaust gasses may overheat, coolant from the coolant system 170 is directed to and circulated about the injector.

If the coolant temperature exceeds the boiling temperature of the reductant agent, for example due to the heat load from the power system 102 or overheating of the injector 130 by the hot exhaust gasses, the reductant agent may boil inside of the injector tip and unintentionally leak into the exhaust system 110. The leaked reductant agent may be in excess of that which can be efficiently converted with $NO_x$ or decompose with the exhaust gasses, due for example to stoichiometric limitations, which may result in slippage of the reductant agent to the atmosphere. Additionally, the excess reductant agent may build up in thick layers within the exhaust channel 112 forming deposits that are detrimental to the SCR process and the exhaust system in general. Further, the deposits may buildup around the flange 139 disposed in the exhaust channel 112 and towards which the reductant agent is directed.

To reduce leakage, slippage and the buildup of deposits, a coolant temperature sensor 190 can monitor the coolant temperature, which is indicative of the temperature of the injector 130, and communicate that information to the controller 150. A control strategy executed by the controller 150 determines if the coolant temperature and possibly other factors indirectly indicate if the coolant in the injector may be boiling. In the event boiling and thus leakage is likely, the controller can decrease or slow the injection timing, i.e., decrease the frequency or lengthen the period between injections of reductant agent. Decreasing the injection timing provides additional time for the excess reductant agent to convert or decompose before additional reductant agent is introduced to the exhaust channel. This in turn may beneficially reduce slippage and/or deposit formation. Alternatively, if the control strategy determines that boiling and thus leakage is not likely, the controller 150 can increase or maintain the injection timing since the conversion process is likely occurring efficiently for those operating conditions. The disclosed SCR system thereby promotes conversion efficiency and the overall conservation of reductant agent.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

We claim:

1. A selective catalytic reduction system for use with an power system, the selective catalytic reduction system comprising:
   an exhaust system communicating with a power system and directing exhaust from the power system;
   a catalyst disposed in the exhaust system for reducing nitrous oxides in the exhaust;
   an injector communicating with the exhaust system upstream of the catalyst to inject a reductant agent to the exhaust;
   a coolant system circulating a coolant to the power system and circulating the coolant proximately about the injector to affect a temperature of the injector;
   a coolant temperature sensor monitoring a coolant temperature of the coolant; and
   a controller communicating with the coolant temperature sensor and controlling an injection timing of the injector based at least in part on the temperature of the coolant being above a predetermined coolant temperature value.

2. The selective catalytic reduction system of claim 1, wherein the coolant temperature sensor is in thermal contact with at least one of the coolant and/or the injector.

3. The selective catalytic reduction system of claim 2, further comprising an exhaust temperature sensor monitoring an exhaust temperature of the exhaust.

4. The selective catalytic reduction system of claim 3, wherein the controller includes logic for comparing the coolant temperature with the exhaust temperature.

5. The selective catalytic reduction system of claim 4, wherein the controller decreases the injection timing if the coolant temperature is above the predetermined coolant temperature value and the exhaust temperature is below a predetermined exhaust temperature value.

6. The selective catalytic reduction system of claim 5, further comprising an altitude sensor measuring an altitude of the power system.

7. The selective catalytic reduction system of claim 6, wherein the controller decreases the injection timing if the coolant temperature is above the predetermined coolant temperature value and the altitude is above a predetermined altitude value.

8. The selective catalytic reduction system of claim 1, wherein the controller adjusts the injection timing inversely with respect to the coolant temperature.

9. The selective catalytic reduction system of claim 1, wherein the controller decreases the injection timing if the coolant temperature is at a boiling point of the reductant agent.

10. A method of controlling injection of a reductant agent to an exhaust system in a selective catalytic reduction system, the method comprising:
    directing exhaust from a power system via an exhaust system;
    injecting a reductant agent into the exhaust via an injector communicating with the exhaust system;
    circulating a coolant from a coolant system to the injector;
    monitoring a coolant temperature of the coolant; and
    adjusting an injection timing of injecting the reductant agent based at least in part on the coolant temperature being above a predetermined coolant temperature value.

11. The method of claim 10, where the step of monitoring the coolant temperature includes placing a coolant temperature sensor in thermal contact with at least one of the coolant and/or the injector.

12. The method of claim 11, further comprising:
    monitoring an exhaust temperature of the exhaust;
    comparing the coolant temperature with the exhaust temperature; and
    adjusting the injection timing based at least in part on comparing the coolant temperature with the exhaust temperature.

13. The method of claim 12, wherein the step of adjusting the injection timing further comprises:

decreasing the injection timing when the coolant temperature is above the predetermined coolant temperature value and the exhaust temperature is below a predetermined exhaust temperature value.

14. The method of claim 13, wherein the injection timing is decreased to at or below 1 injection per 2 seconds.

15. A method of reducing deposit build-up in an exhaust system comprising:
  directing exhaust from a power system via an exhaust system;
  circulating a coolant to the power system;
  dosing the exhaust with an agent so as to convert the agent to a reductant;
  monitoring a coolant temperature of a coolant; and
  adjusting the timing pattern of dosing if the coolant temperature is above a predetermined coolant temperature value in order to increase a quantity of the agent converted to reductant.

16. The method of claim 15, wherein the step of dosing the exhaust with the agent is accomplished by an injector communicating with the exhaust system.

17. The method of claim 16, further comprising circulating the coolant about the injector.

18. The method of claim 17, wherein the step of measuring the coolant temperature is accomplished indirectly by monitoring an injector temperature of the injector.

\* \* \* \* \*